United States Patent [19]

Fisher et al.

[11] 4,087,500

[45] May 2, 1978

[54] METHOD OF MAKING A DUO DENSITY SILICON NITRIDE ARTICLE

[75] Inventors: Eugene A. Fisher; Michael U. Goodyear, both of Plymouth; Arthur F. McLean, Ann Arbor; Karsten H. Styhr, Farmington, all of Mich.

[73] Assignee: Ford Motor Company, Dearborn, Mich.

[21] Appl. No.: 426,987

[22] Filed: Dec. 20, 1973

[51] Int. Cl.$^2$ .................... C04B 35/58; C04B 35/60
[52] U.S. Cl. .................... 264/42; 264/60; 264/63; 264/65; 264/248
[58] Field of Search ........... 264/6, 56, 63, 65, 60, 264/263, 332, 42

[56] References Cited

U.S. PATENT DOCUMENTS

| 2,195,297 | 9/1938 | Engle | 264/56 |
| 2,434,271 | 1/1948 | Howatt | 264/63 |
| 3,399,979 | 9/1968 | Hamling | 264/65 |

FOREIGN PATENT DOCUMENTS

| 1,949,587 | 11/1968 | Germany | 264/65 |
| 434,515 | 2/1968 | Japan | 264/332 |
| 1,092,637 | 11/1967 | United Kingdom | 264/65 |

*Primary Examiner*—Robert F. White
*Assistant Examiner*—John A. Parrish
*Attorney, Agent, or Firm*—William E. Johnson; Keith L. Zerschling

[57] ABSTRACT

A method of making a duo density article of silicon nitride is disclosed. A first element is formed by hot pressing silicon nitride particles. The general shape of a second element is formed by injection molding silicon metal particles and a binder and subsequently burning out the binder. The second element is nitrided in a nitriding operation. Facing surface areas of the first element and the second element are bonded together by applying heat to both elements and pressure to one of the elements while the other element is held in a fixed position.

6 Claims, No Drawings

METHOD OF MAKING A DUO DENSITY SILICON NITRIDE ARTICLE

This application results from work carried on for the Department of the Army under contract number DAAG-46-71-C-0162.

BACKGROUND OF THE INVENTION

Silicon nitride has a wide variety of uses based on its physical and chemical properties. These uses, to name a few, include thermocouple protection tubes, crucibles for foundry use, substrates for electronic applications and structural components for gas turbine engines.

Silicon nitride can be produced by a number of different processing techniques with each technique yielding a different final density. Each technique also has a definite restriction on the final shape which may be produced. Simple shapes of better than 98% of theoretical density can be made by hot pressing silicon nitride powder to form the final article. Complex shapes, however, generally cannot be manufactured by this processing technique.

As an alternate to the hot pressing technique, silicon nitride articles of complex shape, having densities of 70 to 75% of theoretical density are produced by an injection molding technique. In this technique, silicon metal particles and a thermoplastic are formed into a mixture. This mixture is injection molded to form the shape of the article. Subsequent operations include the heating of the article to burn out the thermoplastic and a nitriding operation to produce the final silicon nitride article.

It is generally impossible to fabricate a complete rotor for a gas turbine engine of hot pressed, silicon nitride material. The impossibility of manufacturing such a complete rotor by a hot pressing technique comes about because of the complex shape of the rotor blades. The complex shape of such blades can be formed easily by an injection molding technique. It is impossible, however, to form a complete rotor by an injection molding technique as the hub portion of the rotor formed by such a technique cannot withstand the mechanical and the thermal stresses imposed on that portion of the rotor during use in an engine.

This invention teaches a method wherein the best characteristics of hot pressed and injection molded silicon nitride materials are brought together to form a complex article of manufacture such as a rotor for a gas turbine engine. The structure is bonded together by strong and uniform bonds at the junction between the different materials.

SUMMARY OF THE INVENTION

This invention is directed to a method of making an article of silicon nitride and, more particularly, to a method of making a duo density article of silicon nitride. The method has the following general steps.

A first element of silicon nitride is formed in a hot pressing operation. In this operation, substantially pure silicon nitride particles are compacted to at least about 98% of theoretical density. The compacting of the silicon nitride occurs by applying both heat and pressure to a mixture of silicon nitride particles and a densification aid.

A second element has its general shape formed by injection molding silicon metal particles and a carrier, such as a thermoplastic, into a mold. The so molded article is heated to burn out the carrier. The second element is nitrided in a nitriding operation.

A surface area on the first element is brought into close association with a surface area on the second element. The two areas are held in close association with one another. A bond is formed between the associated surfaces of the first and the second elements by applying heat on both elements and pressure on one of the elements while the other of the element is held in a fixed position. This application of heat and pressure forces a portion of the silicon nitride forming the surface area of the one element into bonding relationship with the silicon nitride forming the surface area of the other element whereby a uniform and a strong bond is formed between the first and second elements thereby uniting both of the elements into a single article having two sections of different density.

DESCRIPTION OF THE PREFERRED EMBODIMENT

A process for making a duo density article of silicon nitride material will be described. The article to be described will be a rotor for a gas turbine engine. The first element of the rotor is its central hub. The second element of the rotor is the outer blade ring of complex shape over which the hot gases of the engine flow to turn the rotor.

The method of making a duo density article of silicon nitride in accordance with the general teachings of this invention is initiated by forming a first element which, in this case, is the hub of the rotor. This first element is formed by compacting a mixture consisting of from about 95 to 99.5% by weight of silicon nitride particles and from about 5 to 0.5% by weight of a densification aid. This mixture is compacted to a density of at least 98% theoretical density. The compacting of the mixture is carried out by applying heat and pressure to the mixture, thereby forcing it into a compact form.

In general, the silicon nitride use in the compacting operation is alpha silicon nitride powder. The powder is generally a ceramic grade and is preferably all minus 325 mesh. The silicon nitride powder is wet ball milled in a rubber lined mill with alumina or tungsten carbide balls and alcohol for a time ranging from one day to two weeks. A densification aid, such as magnesium oxide or any other suitable material, is mixed thoroughly with the silicon nitride powder during the milling operation. Concentrations of the densification aid are generally in the range from about 0.5 to 500 weight percent. The aid helps in the powder compaction process. After milling, the silicon nitride powder slurry is dried and screened through a 100 mesh screen for hot pressing.

The hub of first element is hot pressed to the approximate final dimensions and contours in a graphite die system. Barrier materials are coated on the graphite die to minimize any reaction between the powder and the die system. The barrier material commonly used in graphite foil. The silicon nitride material is hot pressed at a temperature from about 1650° C to about 1800° C and at a pressure of from about 3000 psi to about 4000 psi. The pressing operation takes place for a time from one to three hours. The final article produced by this method is the first element of hot pressed silicon nitride material. The material has a density in excess of 98% theoretical and is extremely strong. The material readily withstands both the temperature and the stress load imposed when it is used as the hub portion of a turbine rotor.

The general shape of the second element, which in this case is the turbine blade ring of complex configuration, is injection molded as a single unit. The blade ring has individual blades extending radially outwardly from a ring interconnecting all the blades. The interconnecting ring has an inwardly facing circumferential surface. A typical molding compound for forming the second element is one in which the silicon metal particles comprise about 60 to 66% of its volume with the remainder being a thermoplastic binder. In general, the particle size of the metal will be such that the material will have a maximum particle size in the range of 40 to 60 microns and a mean particle size in the range from 10 to 13 microns. Once a molding composition is formed, the composition is fed into a cylinder of an injection molding machine. The machine heats the thermoplastic above its melting point. Pressure is applied to the cylinder and the molding composition is shot into a cold molding die having the configuration of the blade ring to be produced. The thermoplastic solidifies into the desired shape thereby locking the silicon metal particles carried along with it into the desired shape.

The so formed blade ring of silicon metal and thermoplastic is gradually heated in a furnace to a temperature of about 350° C. The heating program may take as long as three days so that no stresses are created in the article during heating. During this heating, the thermoplastic binder is burned out. This action leaves behind silicon metal in the desired shape of the blade ring.

The second element is subjected to a nitriding operation. Since the element is formed of pure silicon particles, the nitriding operation is effective to change the element into silicon nitride. In the nitriding operation the element is heated while exposed to nitrogen gas at a temperature and for a sufficient period of time that all of the silicon is transformed into silicon nitride.

A full procedure for nitriding silicon to form silicon nitride is disclosed in U.S. patent application Ser. No. 411,599, filed Oct 30, 1973 entitled "Improved Process for Making Silicon Nitride Articles," abandoned, which application is assigned to the same assignee as this application. This application is hereby incorporated by reference. In the nitriding operation, the injection molded silicon is converted into silicon nitride having a density of 70 to 75% of theoretical density.

The first element is bonded to the second element in the following manner. The first element, namely the hot pressed hub, has an outer circumferential surface which is brought into engagement with an inwardly facing circumferential surface formed on the second element. The surface areas which are brought into close association may be machined on each of the elements so that proper sizing is obtained. The associated elements are placed in a pressing die and heat and pressure are applied thereto while the second element is supported to resist the pessure. The pressure applied on the central hub or first element is from at least about 1000 lbs. per square inch to about 3500 lbs. per square inch while the elements are maintained at a temperature in the range from 1625° C to about 1700° C for a time of at least 1.5 hours. During this hot pressing operation, a bond is formed between the associated surfaces of the first and second elements as the silicon nitride of both surfaces tends to migrate into the other surface thereby forming a uniform and strong bond therebetween.

The so completed article is thereby formed of silicon nitride material having two different densities. The central portion of the formed article is hot pressed silicon nitride of high density. The complex turbine blades themselves are formed from injection molded material which produce a silicon nitride material of less than theoretical density. Both of the differently formed silicon nitride materials are uniformly bonded to one another to produce the final article which exhibits all the strength and temperature resistant characteristics for which silicon nitride is known.

There has been disclosed herein a method of making a duo density article of silicon nitride. In view of the teachings of this specification, those skilled in the art will be led to make modifications of this invention. It is intended that all modifications which fall within the spirit and scope of this invention be included within the appended claims.

We claim:

1. A method of making a duo density article of silicon nitride which comprises the steps of:
    compacting a mixture consisting of from about 95 to 99.5% by weight silicon nitride particles and from about 5 to 0.5% by weight of a densification aid to at least 98% of theoretical density by use of heat and pressure thereby to form a first element of silicon nitride;
    forming the general shape of a second element by (a) injection molding silicon metal particles and a carrier to fform the general shape of said second element, and (b) heating said second element to burn out said carrier;
    nitriding said second element so that said element is converted substantially to pure silicon nitride;
    bringing a surface area of said first element into close association with a surface area of said second element;
    holding said associated surfaces of said first and said second elements so they do not move with respect to one another; and
    forming a bond between said associated surfaces of said first and said second elements by applying heat on both elements and pressure on one of said elements while the other of said elements is held thereby to force a portion of the silicon nitride forming said surface area of said one element into bonding relationship with said surface area of the other element.

2. The method of claim 1 wherein: said first element is the one element to which pressure is applied to force its surface area into bonding relationship with said surface area of said second element.

3. The method of claim 1 wherein: said densification aid is magnesium oxide.

4. The method of claim 1 wherein: said compacting operation takes place at a temperature from of about 1650° C to about 1800° C at a pressure of from at least 3000 psi and for a time of at least 1.5 hours.

5. The method of claim 1 wherein: said bond forming operation takes place at a temperature of from about 1625° C to about 1700° C at a pressure of at least 1000 psi and for a time of at least 1.5 hours.

6. The method of claim 1 wherein: said suitable carrier used in the formation of said second element is a thermoplastic resin.

* * * * *